United States Patent
Müller et al.

(10) Patent No.: US 12,449,323 B2
(45) Date of Patent: Oct. 21, 2025

(54) HOUSING WITH VENTING SLEEVE AND MEASURING DEVICE, AND PRESSURE MEASURING DEVICE FOR PROCESS MEASURING, COMPRISING SUCH A HOUSING

(71) Applicant: IFM Electronic GmbH, Essen (DE)

(72) Inventors: Hans-peter Müller, Blitzenreute (DE); Robert Mönnig, Essen (DE)

(73) Assignee: IFM Electronic GmbH, Essen (DE)

( * ) Notice: Subject to any disclaimer, the term of this patent is extended or adjusted under 35 U.S.C. 154(b) by 301 days.

(21) Appl. No.: 17/799,867

(22) PCT Filed: Feb. 12, 2021

(86) PCT No.: PCT/EP2021/053507
§ 371 (c)(1),
(2) Date: Aug. 15, 2022

(87) PCT Pub. No.: WO2021/165158
PCT Pub. Date: Aug. 26, 2021

(65) Prior Publication Data
US 2023/0088421 A1     Mar. 23, 2023

(30) Foreign Application Priority Data
Feb. 17, 2020   (DE) .......................... 102020104039.3

(51) Int. Cl.
*G01L 19/14*     (2006.01)
*G01L 19/06*     (2006.01)

(52) U.S. Cl.
CPC .......... *G01L 19/14* (2013.01); *G01L 19/0645* (2013.01)

(58) Field of Classification Search
CPC . G01L 19/14; G01L 19/0645; G01L 19/0007; G01L 19/144; G01L 19/0654; H05K 5/0216
See application file for complete search history.

(56) References Cited

U.S. PATENT DOCUMENTS 6,145,392 A * 11/2000 Kathan ................. G01K 1/14
                                                             73/866.5
7,585,211 B2 * 9/2009 Qualy .................... B01D 65/00
                                                             454/270

(Continued)

FOREIGN PATENT DOCUMENTS

| CN | 101282886 A | 10/2008 |
|---|---|---|
| CN | 105683731 A | 6/2016 |

(Continued)

*Primary Examiner* — Freddie Kirkland, III
(74) *Attorney, Agent, or Firm* — Patent Technologies, LLC; Robert D. Gunderman, Jr.

(57) ABSTRACT

The invention relates to a housing comprising a venting device (10) which is arranged on the housing (2) and which allows an ambient pressure to be supplied to the interior of the housing (2). The venting device (10) is made of a sleeve-like protective cap (11) with lateral openings (12) and a liquid-repellant membrane, and a cavity for receiving the membrane is formed in the interior of the venting device (10). The membrane is arranged such that an opening, which is provided for the pressure supply, in the wall of the housing (2) is covered. In order to prevent the so-called teapot effect and therefore allow a light dripping of a liquid on the venting device (10), the sleeve-like protective cap (11) has a narrow circumferential expansion (14) in the region of the lateral surface of the protective cap such that a defined dripping edge is formed.

3 Claims, 1 Drawing Sheet

(56) References Cited

U.S. PATENT DOCUMENTS

Figure 1:
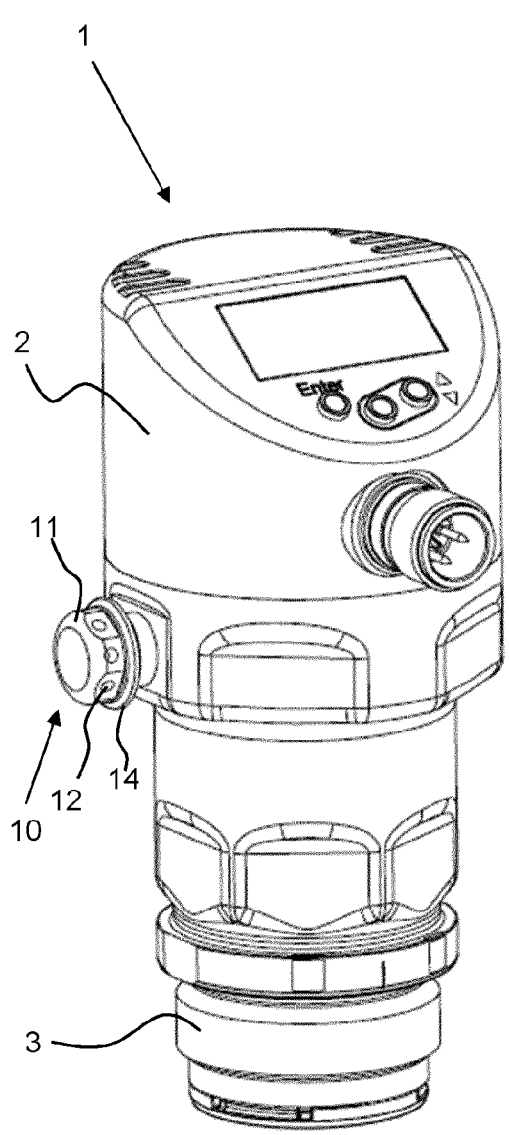

| | | | |
|---|---|---|---|
| 8,574,045 B2* | 11/2013 | Warner | E03B 11/08 |
| | | | 454/366 |
| 10,168,240 B2* | 1/2019 | Schonhardt | G01L 19/144 |
| 11,022,513 B2* | 6/2021 | Knoll | G01L 9/0075 |
| 11,199,461 B2* | 12/2021 | Haeussermann | G01L 19/0084 |
| 2007/0042704 A1* | 2/2007 | Qualy | H05K 5/068 |
| | | | 454/250 |
| 2017/0089794 A1* | 3/2017 | Schonhardt | G01L 19/0654 |

FOREIGN PATENT DOCUMENTS

| | | |
|---|---|---|
| CN | 106461488 A | 2/2017 |
| CN | 205937803 U | 2/2017 |
| DE | 204 767 A1 | 7/1983 |
| DE | 10 2010 025 979 A1 | 1/2012 |
| DE | 10 2014 107 251 A1 | 11/2015 |
| DE | 10 2015 109 704 A1 | 12/2016 |
| DE | 10 2015 215 991 B3 | 1/2017 |
| EP | 1 740 861 B1 | 11/2008 |
| WO | WO 2007 022340 A2 | 2/2007 |

\* cited by examiner

HOUSING WITH VENTING SLEEVE AND MEASURING DEVICE, AND PRESSURE MEASURING DEVICE FOR PROCESS MEASURING, COMPRISING SUCH A HOUSING

The invention relates to a housing according to the preamble of claim 1, a measuring device as well as a pressure measuring device for process measuring technology comprising such a housing.

Measuring devices of the aforementioned type are used in automation technology to monitor the properties of a fluid, for example with regard to pressure, temperature, flow rate, level. Depending on the application, the measuring devices are exposed to different weather conditions or have to be cleaned frequently in order to maintain hygienic conditions, which is done e.g. by means of a high-pressure or steam jet. In the case of pressure measuring devices, however, a passage in the housing is necessary, since the measured pressure values must be set in relation to the ambient pressure in order to output the relative pressure.

Such passages in housings are not only relevant for pressure measuring devices, but also for other measuring devices and housings in general, in which a pressure difference with respect to the interior of the housing, e.g. due to a changing atmospheric pressure, is to be avoided.

For this purpose, one-piece barriers in the form of films or membranes are known from the prior art. DE 102 32 028 B4 proposes, for example, to provide a passage in the housing wall, which is closed with a liquid-repellent and gas-permeable segment, in order to achieve pressure equalization between the interior of the housing and the external environment of the housing. In this case, the segment consists of film, e.g. a plastic film, or a membrane, e.g. made of PTFE.

However, the disadvantage of this is that the films or membranes can be subjected unprotected to a high pressure or steam jet used for cleaning purposes.

For this reason, sleeve-type impact protection devices are used in particular for pressure measuring devices and are implemented as small, cylindrical bodies projecting laterally from the housing of the measuring device in the form of a protective cap and have lateral openings in order to prevent a direct jet onto the membrane or film. A pressure measuring device with such an impact protection device is known, for example, from DE 10 2014 107 251 A1.

If the venting sleeve is designed in the form of the aforementioned impact protection devices, the so-called teapot effect can occur. In particular, during the cleaning process, the cleaning liquid does not drip off completely or fast enough at the front edge of the venting sleeve, but flows at least partially along the side surfaces of the venting sleeve towards the measuring device housing and thus also via the openings in the venting sleeve provided for the exchange of air. The openings may then be temporarily at least partially closed, which may impair air exchange during this time.

In order that a liquid which runs down from the housing cannot advance as far as the openings for air exchange, from DE 102015109704 A1 it is known to arrange a shoulder region between the venting sleeve and the housing.

It is an object of the invention to improve a venting sleeve for a measuring device mentioned above in such a way that the teapot effect is avoided and thus a closing of the venting openings by a liquid is prevented.

This object is achieved by a housing, a measuring device, and a pressure measuring device as disclosed and claimed herein.

According to the invention, the sleeve-like protective cap has a narrow, circumferential expansion in the region of its side surface, so that a defined drip edge is formed. The problem with the venting sleeve is primarily the downwardly oriented area, which can be located differently depending on the installation variant of the pressure measuring device. The circumferential expansion would thus cover every conceivable installation variant of the housing or the (pressure) measuring device.

The narrow, circumferential expansion here represents a kind of grommet in which a liquid located in the downwardly oriented area of the venting sleeve would be forced to flow upward after passing around the defined tear-off edge created by the expansion, but this is prevented by gravity. As a result, the liquid drips off the narrow expansion. The narrower the circumferential expansion is designed, the more strongly a tear-off edge is formed, which further facilitates the tearing off of the drop at the drip edge.

An advantageous further development provides that the narrow, circumferential expansion is arranged at such a distance from the housing that a liquid draining off the housing, e.g. a condensate or a cleaning liquid, cannot even enter into the region of the openings. Due to the continuous dripping off of the liquid, less liquid remains on the housing of the measuring device and on the venting device itself during the cleaning process.

Thus, as a result, the narrow circumferential expansion has two functions: it forms a drip edge and, at the same time, provides a barrier that prevents any liquid draining from the housing from entering the region of the openings.

Figure 2:
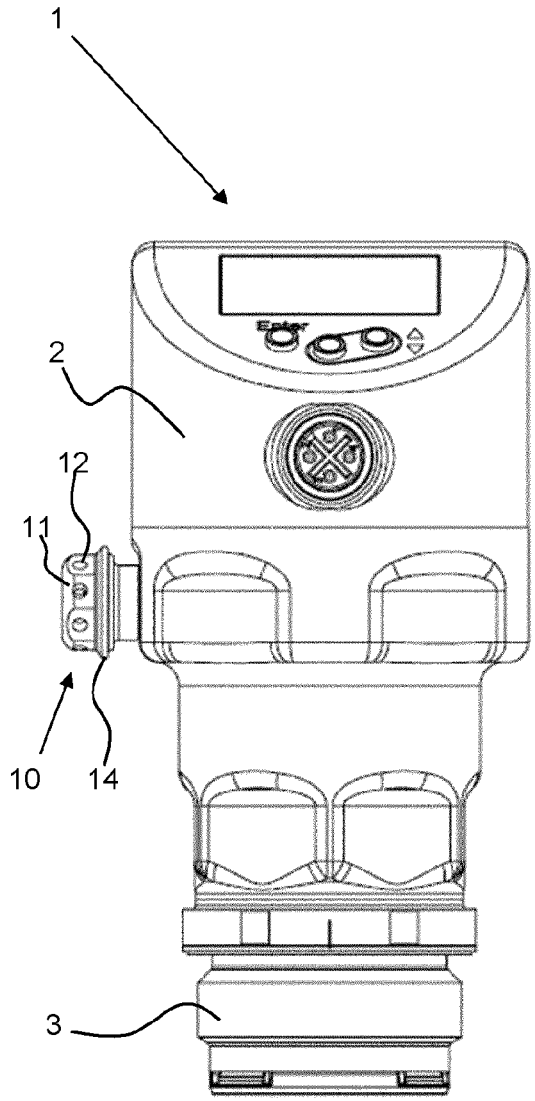

In the following, the invention will be explained in more detail based on exemplary embodiments with reference to the drawings. The drawings schematically show:

FIG. 1 is a perspective view of a pressure measuring device according to the invention; and FIG. 2 is a front view of a pressure measuring device according to the invention.

In the following description of the preferred embodiments, identical reference symbols denote identical or comparable components.

FIGS. 1 and 2 respectively show an electronic pressure measuring device 1 for use in process measurement technology which is manufactured and sold by the applicant under the designation PIxxxx. However, the invention is not limited to a pressure measuring device but can be applied to housings of any kind in which a pressure difference between the interior of the housing and the environment is to be avoided, e.g. as a result of a changing atmospheric pressure, or in which moist air is to escape from the interior, e.g. in the case of a temperature change in a moist environment and a resulting condensation in the interior of the housing.

The measuring device 1 essentially consists of a housing 2, which is placed on a process connection 3. The process connection 3 comprises, on the one hand, the sensor unit in the form of a pressure measuring cell (not shown) and, on the other hand, enables the mechanical connection of the measuring device 1 to the container or pipe containing the medium. The housing 2 accommodates the evaluation electronics (not shown), which is provided for evaluating and processing the measurement signals supplied by the sensor unit, which can then be tapped via the plug connection and forwarded, for example, to a PLC.

The housing also includes a display device and operating elements. The operating elements are used to operate the measuring device 1, i.e. to parameterize or set key data such as the switching points. The respective actions are indicated to the user via the display.

In the case of pressure measuring devices which are to measure a pressure relative to the ambient pressure, a venting device 10 is necessary so that the measured pressure values can be set in relation to the ambient pressure in order to output the relative pressure. This venting device 10 first consists of an atmospheric connection to the outside, which is closed by means of a liquid-repellent, breathable membrane, so that pressure exchange is possible, but at the same time the interior of the pressure measuring device is protected from ingress of liquid. To protect this membrane from high pressure or steam jets used for cleaning purposes, the venting device 10 further comprises a protective cap 11 with lateral openings 12.

The invention now focuses on a narrow, circumferential expansion 14 of the protective cap 11, which in turn is arranged at such a distance from the housing 2 of the measuring device 1 that a liquid draining off the housing 2, e.g. consisting of condensate or cleaning liquid, cannot even enter into the region of the openings 12 at the protective cap 11. When the pressure measuring device 1 is cleaned, this liquid or the condensate permanently accumulating on the housing 2 can drip off in a controlled manner at this narrow, circumferential expansion 14, since a kind of grommet is formed at this point. Due to the continuous dripping of the liquid, less liquid remains on the housing 2 of the measuring device as well as on the venting device 10 itself during the cleaning process, so that an impairment of the openings 12 is prevented in a simple manner.

Thus, as a result, the expansion 14 has two functions: it forms a drip edge and, at the same time, prevents any liquid draining from the housing 2 from entering into the region of the openings 12.

LIST OF REFERENCE SYMBOLS 1 pressure measuring device
2 housing
3 process connection
10 venting device
11 protective cap
12 openings
14 narrow circumferential expansion

The invention claimed is:

1. A housing, with a venting device (10) arranged at the housing (2) which enables the supply of an ambient pressure to the interior of the housing (2),
   wherein the venting device (10) is formed from a sleeve-like protective cap (11) with openings (12) at its side surface and a liquid-repellent membrane,
   wherein a cavity for accommodating the membrane is formed in the interior of the venting device (10) and the membrane is arranged such that an opening in the wall of the housing (2) provided for the pressure supply is covered, and wherein an air exchange between the cavity of the venting device (10) and the environment takes place via the openings (12) at the side surface of the sleeve-like protective cap (11),
   wherein the sleeve-like protective cap (11) comprises a narrow, circumferential expansion (14) in the region of its side surface, so that a defined drip edge is formed,
   wherein the narrow, circumferential expansion (14) is arranged at such a distance from the housing (2) that a liquid draining off of the housing (2) cannot enter into the region of the openings (12).

2. A measuring device for process measurement technology, the measuring device comprising a housing, with a venting device (10) arranged at the housing (2) which enables the supply of an ambient pressure to the interior of the housing (2),
   wherein the venting device (10) is formed from a sleeve-like protective cap (11) with openings (12) at its side surface and a liquid-repellent membrane,
   wherein a cavity for accommodating the membrane is formed in the interior of the venting device (10) and the membrane is arranged such that an opening in the wall of the housing (2) provided for the pressure supply is covered, and wherein an air exchange between the cavity of the venting device (10) and the environment takes place via the openings (12) at the side surface of the sleeve-like protective cap (11),
   wherein the sleeve-like protective cap (11) comprises a narrow, circumferential expansion (14) in the region of its side surface, so that a defined drip edge is formed,
   wherein the narrow, circumferential expansion (14) is arranged at such a distance from the housing (2) that a liquid draining off of the housing (2) cannot enter into the region of the openings (12).

3. A pressure measuring device, with a housing (2), a pressure measuring cell arranged in the housing, and a venting device (10) which is arranged at the housing (2) and enables the supply of ambient pressure to the pressure measuring cell and thus the measurement of a relative pressure,
   wherein the venting device (10) is formed from a sleeve-like protective cap (11) with openings (12) at its side surface and a liquid-repellent membrane,
   wherein a cavity for accommodating the membrane is formed in the interior of the venting device (10) and the membrane is arranged in such a way that an opening provided for the pressure supply in the wall of the housing (2) is covered, and
   wherein an air exchange between the cavity of the venting device (10) and the environment takes place via the openings (12) at the side surface of the sleeve-like protective cap (11),
   wherein the sleeve-like protective cap (11) comprises a narrow, circumferential expansion (14) in the region of its side surface, so that a defined drip edge is formed,
   wherein the narrow, circumferential expansion (14) is arranged at such a distance from the housing (2) of the measuring device (1) that a liquid draining off of the housing (2) cannot enter into the region of the openings (12).

* * * * *